United States Patent
O'Connor et al.

(10) Patent No.: US 9,167,094 B2
(45) Date of Patent: Oct. 20, 2015

(54) SYSTEM AND METHOD FOR ASSISTING AGENTS OF A CONTACT CENTER

(71) Applicant: Avaya Inc., Basking Ridge, NJ (US)

(72) Inventors: Neil O'Connor, Galway (IE); Paul D'Arcy, Limerick (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/786,804

(22) Filed: Mar. 6, 2013

(65) Prior Publication Data

US 2014/0254775 A1    Sep. 11, 2014

(51) Int. Cl.
*H04M 5/00* (2006.01)
*H04M 3/51* (2006.01)

(52) U.S. Cl.
CPC .... *H04M 3/5175* (2013.01); *H04M 2203/2038* (2013.01); *H04M 2203/403* (2013.01); *H04M 2242/24* (2013.01)

(58) Field of Classification Search
CPC ... H04M 3/51; H04M 3/5175; H04M 3/5232; H04M 3/523
USPC .......................................... 379/265.01–266.1
See application file for complete search history.

(56) References Cited

U.S. PATENT DOCUMENTS

| | | | |
|---|---|---|---|
| 6,047,060 A * | 4/2000 | Fedorov et al. | 379/265.02 |
| 8,706,498 B2 * | 4/2014 | George | 704/270 |
| 2004/0042612 A1 * | 3/2004 | Michelson et al. | 379/265.13 |
| 2006/0062376 A1 * | 3/2006 | Pickford | 379/265.12 |
| 2009/0171668 A1 * | 7/2009 | Sneyders et al. | 704/275 |
| 2011/0010173 A1 * | 1/2011 | Scott et al. | 704/235 |
| 2011/0191106 A1 * | 8/2011 | Khor et al. | 704/251 |
| 2011/0208660 A1 * | 8/2011 | Erbey et al. | 705/304 |
| 2012/0045043 A1 * | 2/2012 | Timpson | 379/88.04 |
| 2012/0317038 A1 * | 12/2012 | Erbey et al. | 705/304 |

* cited by examiner

*Primary Examiner* — Sonia Gay
(74) *Attorney, Agent, or Firm* — Maldjian Law Group LLC

(57) ABSTRACT

An agent assisting system for providing assistance to agents of contact center during calls is provided. The agent assisting system includes a monitoring module configured to monitor parameters of a call coming to the contact center. The agent assisting system further includes a sentiment detector module configured to detect sentiments of a user during the call. The agent assisting system further includes a pattern matching module configured to determine a script for an agent handling the call, based on the parameters of the call and the sentiments of the user during the call, wherein the script providing instructions to the agent to improve handling of the call. The agent assisting system further includes a script publishing module configured to publish the script to the agent handling the call.

18 Claims, 4 Drawing Sheets

SYSTEM AND METHOD FOR ASSISTING AGENTS OF A CONTACT CENTER

BACKGROUND

1. Field of the Invention

Embodiments of the present invention generally relate to a system and method for managing service levels of a contact center and particularly to a system and method for assisting agents of the contact center during calls.

2. Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are client or operator-specifiable (i.e., programmable by the operator of the contact center), via a capability called vectoring. Normally, in present-day ACDs when the ACD system's agent assisting system detects an agent has become available to handle a contact, the agent assisting system identifies all predefined contact-handling queues for the agent (usually in some order of priority) and delivers to the agent the highest-priority, oldest contact that matches the agent's highest-priority queue. Generally, the only condition that results in a contact not being delivered to an available agent is where there are no contacts waiting to be handled.

The primary objective of contact center management is to ultimately maximize contact center performance and profitability. An ongoing challenge in contact center administration is monitoring and optimizing contact center efficiency. Contact center efficiency is generally measured in two ways.

Service level is one measurement of contact center efficiency. Service level is typically determined by dividing the number of contacts accepted within the specified period by the number accepted plus the number not accepted, but completed in some other way (e.g., abandoned, given busy, canceled, flowed out). Of course, service level definitions may vary from one enterprise to another.

Match rate is another indicator used in measuring contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when KPIs are managed near, but not above, SLA levels.

Throughput is a measure of the number of calls/contact requests or work requests that can be processed in a given amount of time. Agent utilization is a measure of how efficiently agents' time is being used. Customer service level is a measure of the time customers spend waiting for their work to be handled. Company contact center customers wish to provide service to as many requests as possible in a given amount of time, using the least number of agents to do so, and minimizing the wait time for their customers.

Typically, when a new work request arrives into a contact center, a most suitable agent to work on it is selected by the contact center to handle the work request. However, all agents are not at same level in the contact center. Some of the agents are very skilled (also called as gold rated agents), but some of the agents are not very skilled, but having some minimum skills (also called silver rated agents). Hence, it is possible all gold rated agents are busy at some time. The contact center may forward calls at those times to silver rated agents. However, as discussed above, silver rated agents have only basic skill level, and there is no guarantee those calls will be handled at the same quality provided by gold rated agents. Hence, customers at those calls will remain unsatisfied by the handling of their calls, and this may affect business of contact center.

Further, contact centers keep hiring new agents depending upon the contact centers' requirement. Training of new agents is typically done at back-end, without exposing them to real time environment, as there are chances of mishandling of calls. After some initial training, new agents require exposure of real time training for improving their skills level. However, the contact centers do not want to lose business because of it. Hence, in a conventional contact center, coaching of the agents is done with assistance of a supervisor, who generally sits alongside an agent, and provides prompts and assistance on an ongoing basis during a training shift in real time environment. The supervisor may also sit elsewhere like his/her desk and use features such as observe/whisper to listen in to ongoing calls and provide necessary help to the agents through telephone calls, emails, or over an intranet. However, these traditional processes are manual, stress full and time consuming for a supervisor. Further, there also chances of mishandling of calls, as the supervisor can't help all agents in his/her team at same time.

There is thus a need for a contact center that can assist agents during calls and provide necessary training to the agents to handle calls in a real time environment.

SUMMARY

Embodiments in accordance with the present invention provide an agent assisting system for providing assistance to agents of contact center during calls. The agent assisting system includes a monitoring module configured to monitor parameters of a call coming to the contact center. The agent assisting system further includes a sentiment detector module configured to detect sentiments of a user during the call. The agent assisting system further includes a pattern matching module configured to determine a script for an agent handling the call, based on the parameters of the call and the sentiments of the user during the call, wherein the script providing instructions to the agent to improve handling of the call. The agent assisting system further includes a script publishing module configured to publish the script to the agent handling the call.

Embodiments in accordance with the present invention further provide a computer-implemented method for providing assistance to agents of a contact center during calls. The computer-implemented method includes monitoring parameters of a call coming to the contact center, detecting sentiments of a user during the call, determining a script for an agent handling the call, based upon the parameters of call and the sentiments of the user during the call, wherein the script providing instructions to the agent to improve handling of the call, and publishing the script to the agent handling the call.

Embodiments in accordance with the present invention further provide a computer readable medium storing computer readable instructions when executed by a processor perform a method. The method includes monitoring parameters of a call coming to the contact center, detecting sentiments of a user during the call, determining a script for an agent handling the call, based upon the parameters of call and the sentiments of the user during the call, wherein the script providing instructions to the agent to improve handling of the call, and publishing the script to the agent handling the call.

The present invention can provide a number of advantages depending on a particular configuration. First, the present invention provides assistance to agents in real time and guarantees consistency in quality of call handling. If a silver-rated agent (i.e., not very skilled agent or a secondary skill agent) is handling a call, the present invention monitors sentiments of calls during the calls, and if sentiments of the calls deteriorate, the present invention automatically provides scripts (or instructions) to the agents handing the call to modify handling of the call to convert those calls into successful calls. The scripts include change in a tone, sentiment, or information used by the agent.

Next, the present invention provides training to new agents in real-time environment. Further, the present invention does not require a supervisor to sit alongside an agent, and does not require prompts and assistance from the supervisor on an ongoing basis. Furthermore, the present invention requires no manual training from a supervisor to the contact center agent. The present invention automatically displays training material to the contact center agent to turn around all calls into a successful outcome.

These and other advantages will be apparent from the disclosure of the invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
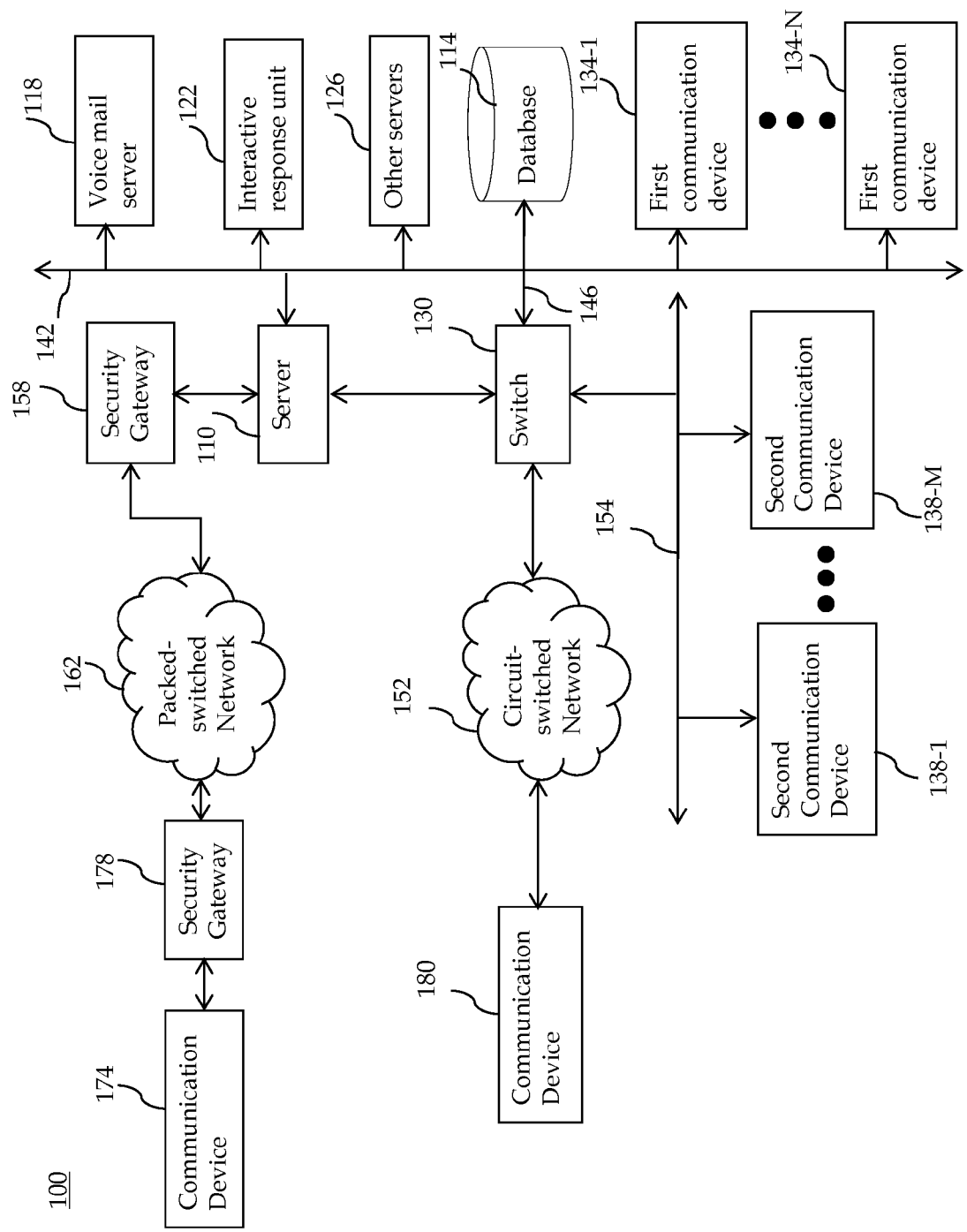
FIG. 1 is a block diagram depicting a contact center according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The invention will be illustrated below in conjunction with an exemplary communication system. Although well suited for use with, e.g., a system having an ACD or other similar contact processing switch, the invention is not limited to any particular type of communication system switch or configuration of system elements. Those skilled in the art will recognize that the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

FIG. 1 shows an illustrative embodiment of the present invention. A contact center 100 comprises a central server 110, a set of data stores or databases 114 containing contact or customer related information and other information that may enhance the value and efficiency of the contact processing, and a plurality of servers, namely a voice mail server 118, an Interactive Response unit (e.g., IVR) 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers may be connected via optional communication lines 146 to the switch 130. As will be appreciated, the other servers 126 may also include a scanner (which is normally not connected to the switch 130 or Web server), VoIP software, video call software, voice messaging software, an IP voice server, a fax server, a web server, an email server, and the like. The switch 130 is connected via a plurality of trunks 150 to the Public Switch Telephone Network or PSTN 152 and via link(s) 154 to the second communication devices 138-1 to M. A gateway 158 is positioned between the server 110 and the packet-switched network 162 to process communications passing between the server 110 and the packet-switched network 162.

Although the preferred embodiment is discussed with reference to client-server architecture, it is to be understood that the principles of the present invention apply to other network architectures. For example, the invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the invention does not require the presence of packet- or circuit-switched networks.

Figure 2:
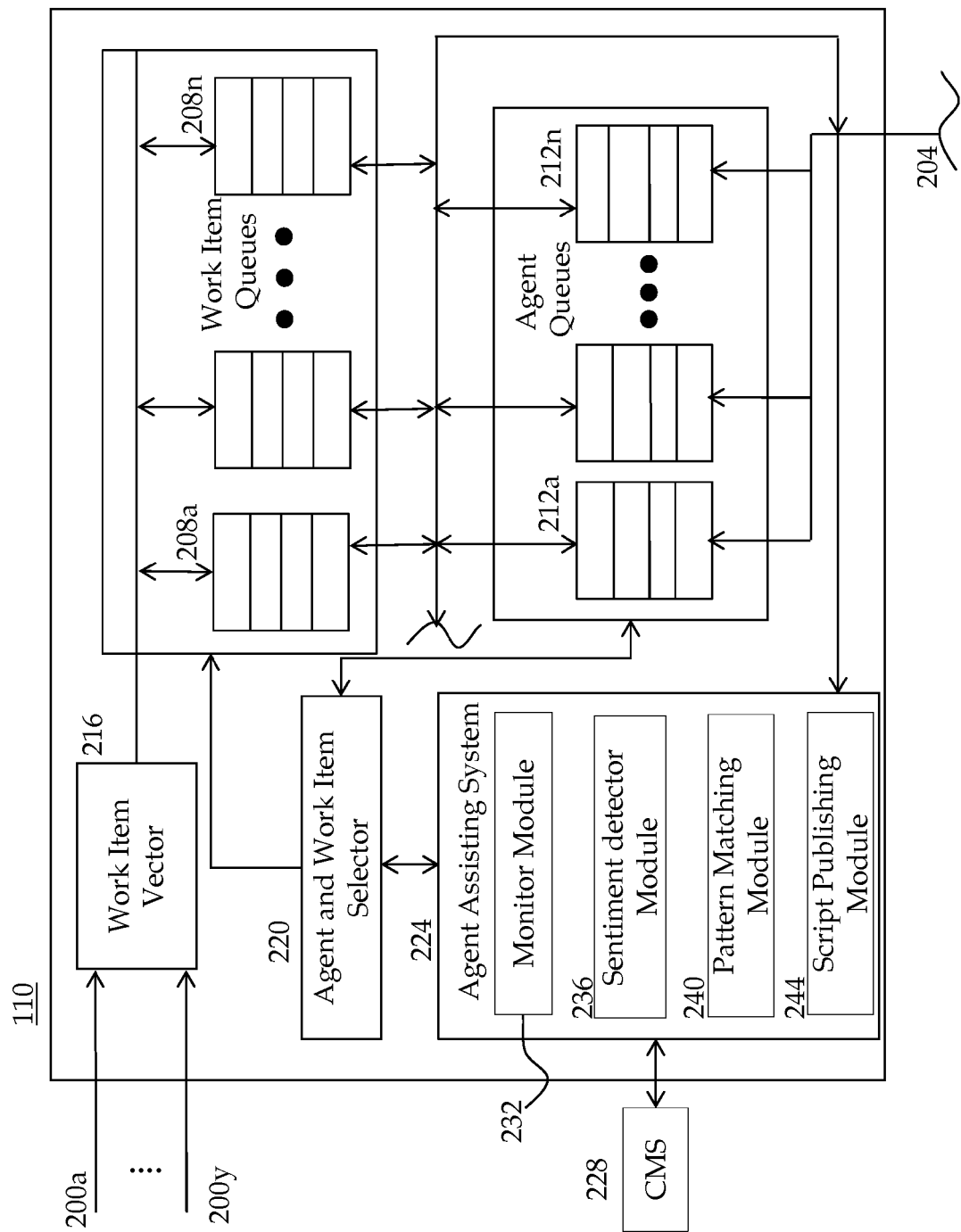
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include Avaya Inc.'s an Operational Analyst™ with On-Line Analytical Processing or OLAP technology or a Call Management System or CMS 228 that gathers contact records and contact-center statistics for use in generating contact-center reports. OA and CMS will hereinafter be referred to jointly as CMS 228.

The switch 130 and/or server 110 may be any architecture for directing contacts to one or more communication devices. In some embodiments, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX)-based ACD system, Multi-Vantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

As can be seen in FIG. 2, included among the data stored in the server 110 is a set of contact queues 208a-n and a separate set of agent queues 212a-n. Each contact queue 208a-n corresponds to a different set of agent queues, as does each agent queue 212a-n. Conventionally, contacts are prioritized and either is enqueued in individual ones of the contact queues 208a-n in their order of priority or is enqueued in different ones of a plurality of contact queues that correspond to a different priority. Likewise, each agent's queues are prioritized according to his or her level of expertise or skill in that queue, and either agents are enqueued in individual ones of agent queues 212a-n in their order of expertise level or are enqueued in different ones of a plurality of agent queues 212a-n that correspond to a queue and each one of which corresponds to a different expertise level.

Included among the control programs in the server 110 is a work item vector 216. Contacts incoming to the contact center are assigned by the work item vector 216 to different work item queues 208a-n based upon a number of predetermined criteria, including customer identity, customer needs, contact center needs, current contact center queue lengths, customer value, and the agent skill that is required for the proper handling of the contact. Agents who are available for handling work items are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212*a-n* at different expertise levels.

In one configuration, the contact center is operated by a contract operator, and each of the work item queues 208*a-n*, and possibly each of the agent queues 212*a-n*, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

Referring again to FIG. 1, the security gateway 158 may be implemented as hardware such as via an adjunct processor (as shown) or as a chip in the server.

The first communication devices 134-1, . . . 134-N are packet-switched and may include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 138-M are circuit-switched. Each of the communication devices 138-1 . . . 138-M corresponds to one of a set of internal extensions Ext1, . . . ExtM, respectively. The second communication devices may include, for example, wired and wireless telephones, PDAs, H.320 videophones and conferencing units, voice messaging and response units, traditional computer telephony adjuncts, and any other communication device.

It should be noted that the present invention does not require any particular type of information transport medium between switch, or server and first and second communication devices, i.e., the present invention may be implemented with any desired type of transport medium as well as combinations of different types of transport channels.

The packet-switched network 162 can be any data and/or distributed processing network, such as the Internet. The packet-switched network 162 typically includes proxies (not shown), registrars (not shown), and routers (not shown) for managing packet flows.

The packet-switched network 162 is in communication with a first communication device 174 via a security gateway 178, and the circuit-switched network 152 with an external second communication device 180.

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming work item by the communications component (e.g., switch 130, fax server, email server, web server, and/or other server) receiving the incoming work item. The incoming work item is held by the receiving telecommunications component until the server 110 forwards instructions to the component to forward or route the contact to a specific contact center resource, such as the IVR unit 122, the voice mail server 118, and/or first or second telecommunication device 134, 138 associated with a selected agent.

The server 110 distributes and connects these work items to telecommunication devices of available agents based on the predetermined criteria noted above. When the central server 110 forwards a voice contact (or first work item) to an agent, the central server 110 also forwards customer-related information from databases 114 to the agent's computer work station for viewing (such as by a pop-up display) to permit the agent to better serve the customer. Depending on the contact center configuration, the central server may forward a list of work items to an available agent to preview before forwarding the work item itself and the data associated therewith to the agent. The agents process the work items or contacts sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to embodiments of the present invention, included among the programs executing on the server 110 are an agent and work item selector 220 and an agent assisting system 224, see FIG. 2. The selector 220 and the agent assisting system 224 are stored either in the main memory or in a peripheral memory (e.g., disk, CD ROM, etc.) or some other computer-readable medium of the contact center 100. The selector 220 effects an assignment between available work items (or contacts) and available agents in a way that tends to maximize contact center efficiency for the current contact center state. The selector 220 uses predefined criteria in selecting an appropriate agent to service the work item. The selector 220, in particular, obtains, for each of a plurality of contact center goals or objectives, status information, or information respecting whether or not a corresponding goal (for example, the service level agreement) is being met or unmet and/or a level to which the corresponding goal is being met or unmet.

For example, exemplary goal levels can be expressed as actual, average or median wait times in each queue 208, actual, average, or median agent staffing levels in each queue 212, actual, average, or median revenue (whether gross or net) realized by a designated set of agents (such as the agents in an agent skill queue) per serviced contact, a customer satisfaction level for a set of designated agents determined during or after servicing of each customer's contact, actual, average, or median time for the agents in a set of designated agents to service contacts, number of contacts to be serviced by a set of designated agents during a selected time period, and the service level agreement between the contractor and the client. This information, along with other statistics is typically gathered by the CMS 228.

The agent and customer profiles are typically maintained and updated by a profile generator (not shown). Upon the completion of handling a work item, the generator collects selected metrics for the work item. These metrics include the skill involved in servicing the work item, the identifier of the servicing agent, the contact duration, the transaction or contact type (e.g., catalog sale, information request, complaint, etc.), the time-of-day, the result (e.g., the type of sale, the number of units sold, revenue generated, service ticket closure or escalation, the information provided, etc.), a self-rating of the servicing agent respecting the agent's proficiency in handling the work item, the rating of the customer of the agent's proficiency in handling the work item, the rating of another party, such as the agent's supervisor or another observer, of how the work item was serviced, whether the agent requested assistance, and whether the agent's training was completed, and stores the information in the database 114, such as CMS 228. The metrics over a selected period of time are typically stored under each agent's profile. Each agent profile typically includes metrics associated with a plurality of work items serviced by the agent for each agent skill, and each customer profile includes metrics associated with a plurality of contacts by the customer.

The agent assisting system 224 has access to various details of incoming calls as well as details of agents handling the calls. The agent assisting system 224 also monitors sentiments of caller during progression of the call. If sentiments of caller deteriorate, it is possible that the caller is unsatisfied from the call, and the call may turn into an unsuccessful call. Unsuccessful calls may harm business of the contact center. Hence, the agent assisting system 224 may provide instructions in form of scripts to agents handling the call. The agents may utilize the script to convert the ongoing call into a successful call. The agent assisting system 224 utilizes a Neural Network engine to determine a suitable script for the agent handling the call.

According to an embodiment of the present invention, the agent assisting system 224 includes a monitor module 232, a sentiment detector module 236, a pattern matching module 240, and a script reporting module 244.

The monitor module 232 may monitor details about an incoming call. In an embodiment, the monitor module 232 may monitor a type of call i.e., whether the call made by the caller is a voice conversation, textual conversation, emails, or an instant messaging. Further, the monitor module 232 may monitor static details about the call, for example, inputs selected by a caller in an IVR menu of the contact center. The monitor module 232 may store the inputs as parameters of the call in the database. For example, if a caller selects 'healthcare option' in an IVR menu and further selects 'claims enquiry', then the agent assisting system 224 may store 'healthcare' and 'claims enquiry' as parameters of the call. Further, the monitor module 232 monitors details of agents handling the call. The monitor module 232 may retrieve profiles of agents from the database to know details of agents handling the call. Furthermore, the monitor module 232 is configured to collect the information conveyed by the caller (e.g., customer) during the call. In one embodiment of the present invention, monitoring of the call is carried out in a real time environment.

The sentiment detector module 236 is configured to detect sentiments of the caller during the call. In one embodiment of the present invention, the sentiment detector module 236 detects the sentiments of the caller from start of call up to end of the call. For example, sentiments at the start of the call may be okay but deteriorate as the call proceeds. The sentiment detector module 236 is also configured to detect the sentiments associated in the texts, emails, or instant messaging.

In an embodiment, for voice contact type, the sentiment detector module 236 may include a sentiment detector, and may be plugged into a media server or gateway of the contact center. In another embodiment, the sentiment detector module 236 may include a text analyzer for text related media, e.g., web chat, text messages, etc. Further, the sentiment detector module 236 may also record the call.

The pattern matching module 240 is configured to select a suitable script for an agent handling the call based upon the parameters of the call and the sentiment of the call. In an embodiment, a Neural Network engine (not shown in Fig.) may be utilized as a pattern matching module. The Neural Network engine may include plurality of patterns that contain a neural model of many events that led to a "successful" outcome for the contact center 100. The Neural Network engine may be first trained by the contact center. For example, an audio/video of previous successful calls may be fed into the Neural Network engine to prepare a list of scripts to convert the calls into successful calls. In an embodiment, a pattern may emerge, whereby low sentiment and high information during the first minute yields a successful outcome. For example, in tele-health, customers may prefer dispassionate initial engagement with raw information, and later in the call the customer may prefer less information and more empathy/sentiment.

A previous successful call having substantially similar parameters (or least different parameters) to the current call may be selected as a reference by the Neural Network engine. The Neural Network engine may determine a script (or technique, information, tone) used in the previous successful call, and select the script for the current call to present to the agent handing the call.

The script publishing module 244 is configured to publish the suitable script to the agent handling the call. The script includes appropriate instructions for the agent to take the call towards a successful call. The instructions include suggested modifications to the way the agent of the contact center 100 may handle the current call. In one embodiment of the present invention, the script publishing module 244 may display the script on the agent's computer screen to lead him to turning the call into a successful call. The script may be provided to the agent on a telephone call, through emails, text messages, or pop-ups on the screen. Examples of script may include, but not limited to, soften your tone, sentiment, or information used by the agent.

Figure 3A:
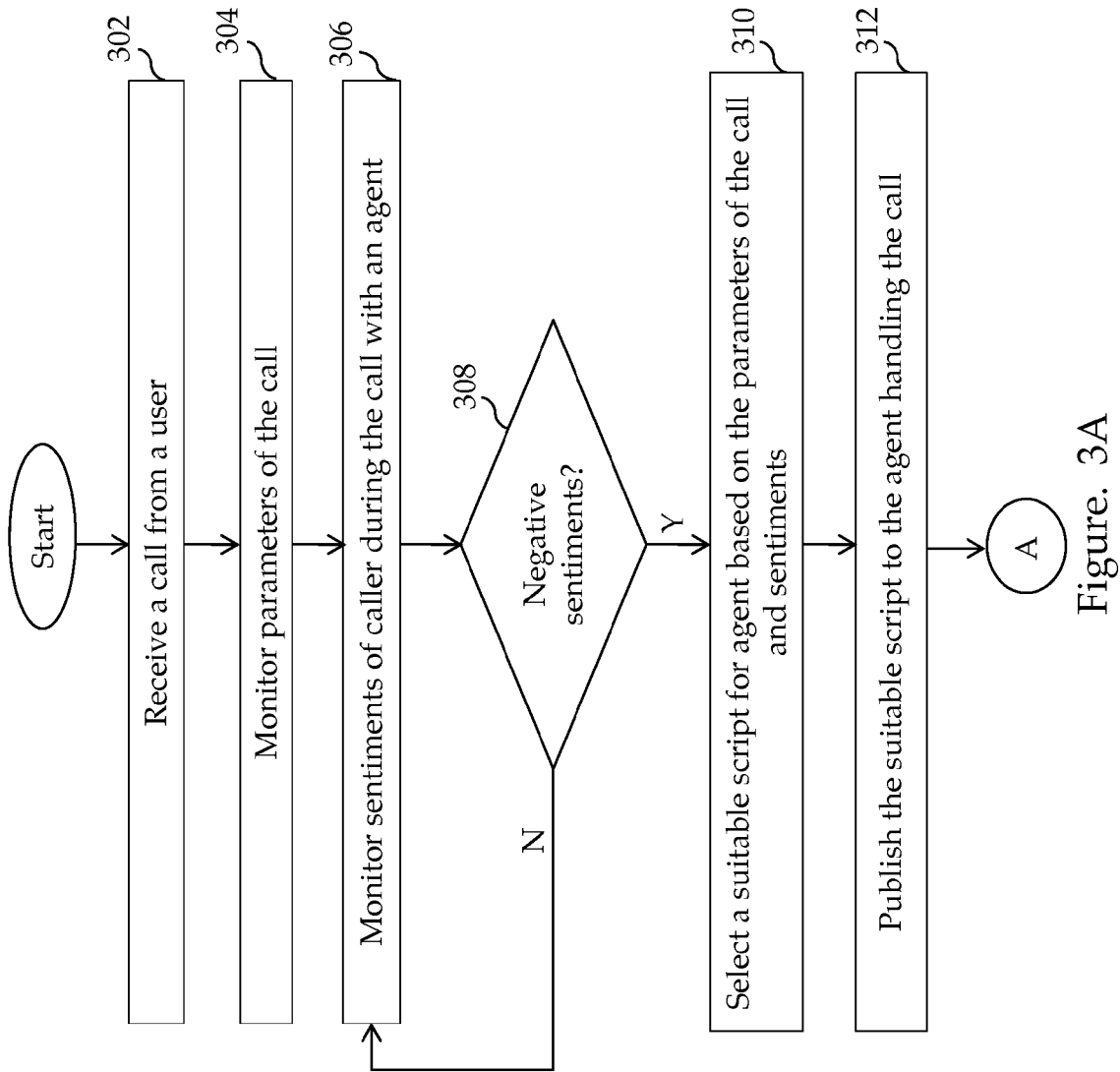
FIGS. 3A and 3B is a flowchart depicting an embodiment of the present invention.
Figure 3B:
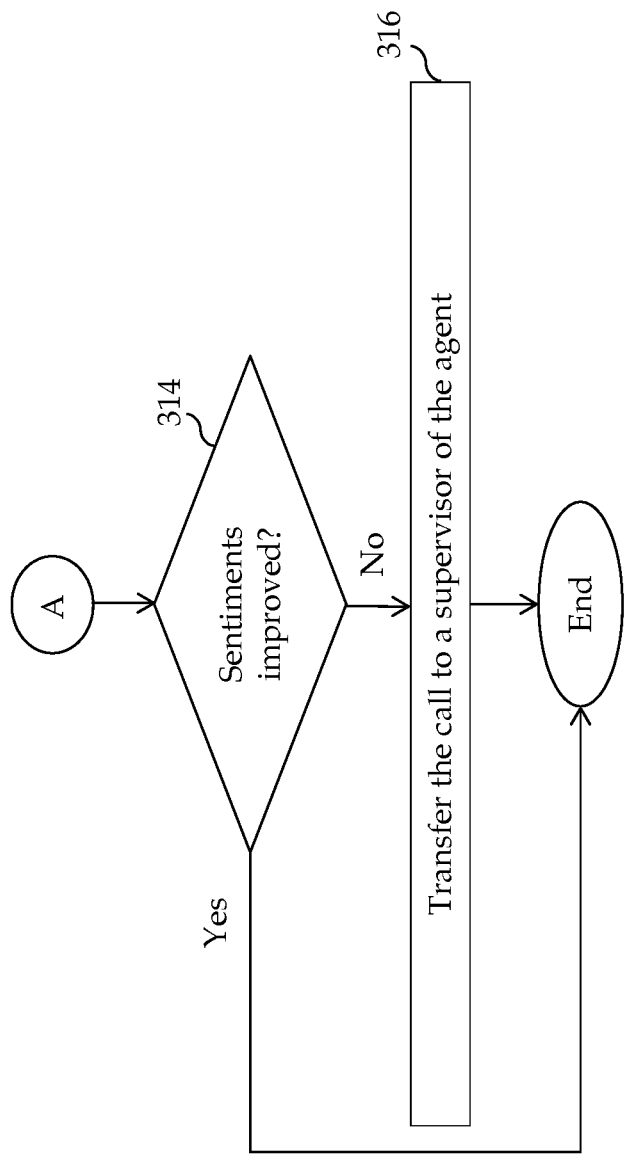

FIGS. 3A and 3B illustrate a flowchart depicting an embodiment of the present invention.

At step 302, the contact center 100 receives a call or a customer service request from a user. In an embodiment of the present invention, the call may include a voice contact e.g., a telephone call to the contact center 100. In another embodiment of the present invention, the call may include email, text message, emails, or instant messaging.

At step 304, parameters of the call are monitored. In an embodiment of the present invention, the contact center 100 may retrieve information such as, type of the call i.e., video call, text message, etc. Further, details of the call may be monitored. For example, inputs selected by a caller in an IVR menu of the contact center may be monitored. For example, if a caller selects "healthcare option" in an IVR menu and further selects "claims enquiry," then "healthcare" and "claims enquiry" may be stored as parameters of the call. In an embodiment, the parameters may be monitored by the monitor module 232.

At step 306, sentiments of the customer during call are monitored. In an embodiment, the sentiments may include positive sentiments and negative sentiments. The positive sentiments indicate that the customer is happy and satisfied from the call. The negative sentiments indicate that the customer is unhappy and unsatisfied from the call. It may be possible that the agent handling the call is not very skilled (e.g., gold rated agent). Hence, the agent may not be skilled enough to satisfy the customer. Further, if the customer is already having some complains, then the agent may face difficulty in managing the call. In an embodiment of the present invention, the sentiments of the customer associated with the call are detected by a sentiment detector module 236.

At step 308, it is determined whether the sentiments during progression of the call are negative. If the sentiments are positive, the customer is satisfied while communicating with the agent, the monitoring of the call is continued, until the call finishes. Otherwise, if the sentiments are negative, at step 310, a suitable script is selected based on the parameters of the call and the sentiment details.

In an embodiment, parameters of the current call may be matched with the parameters of the previous calls between the customers and the agents of the contact center 100. For example, if there are three parameters associated with the call, i.e., a healthcare call, a claim inquiry, and the customer getting angry, a suitable script from a similar previous interactions having substantially similar parameters may be selected. In an embodiment of the present invention, the pattern matching module 240 may select the suitable script.

At step 312, the suitable script is published to the agent handling the call. The script may be flashed on the agent's computer to move the conversation in such a way that may provide a positive outcome for both the customer and the contact center 100. Examples of script may include, but not limited to, soften your tone, sentiment, or information used by the agent. The script may be provided to the agent on a telephone call, through emails, text messages, or pop-ups on the screen. In an embodiment of the present invention, the script publishing module 244 may publish the suitable script.

At step 314, it is determined the sentiments of the call are improved. In an embodiment of the present invention, if the sentiments have been improved, the customer is satisfied while communicating with the agent of the contact center 100, and the method concludes.

If the sentiments of the customer have not been improved, then the method proceeds towards step 316.

At step 316, the supervisor of the contact center is indicated about the progress of the call. In an embodiment of the present invention, the supervisor of the contact center 100 interferes in the call and provides modified instructions and information to the agent of the contact center 100 to handle the call in an efficient way. In another embodiment of the present invention, the supervisor may hook into that call, and may take the call away from that agent of the contact center 100. In yet another embodiment, the call may be directly transferred to the supervisor of the agent. In an embodiment of the present invention, a call transferring module (not shown in the figure) may transfer the call to the supervisor of the agent.

In an embodiment of the present invention, contact center system 100 may include a feedback loop in form of a twill box (not shown in the figure) of the contact center 100. The twill box may provide information to the contact center 100 to push the suitable or best fit script to the agent of the contact center 100 in case, the call is going badly. The information is pushed to the agent's computer to turn the call around.

In yet another embodiment of the present invention, the twill box may also indicate the contact center 100, that the supervisor of the contact center 100 must interfere and manually provide information to handle the call to turn around the call in a successful outcome.

In yet another embodiment of the present invention, the supervisor may also interfere in the call if the call is going really well. This may be done to analyze the call by a supervisor and record the ongoing call to be use as a reference call for training session for other agents in future.

In yet another embodiment of the present invention, if the call is going well and the customer is satisfied with the assistance, then the customer may further inquire about other queries. The agent of the contact center 100 may guide the customer to contact associated agent of the contact center 100 for further queries.

In another embodiment of the present invention, if the ongoing call is generating more successful outcomes with same parameters, then the system may replace earlier scripts with newer ones.

The exemplary systems and methods of this invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the systems and methods of this invention can be implemented in conjunction with a special purpose computer, a programmed microprocessor or microagent assisting system and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a agent assisting system and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An agent assisting system for providing assistance to agents of a contact center during calls, comprising:
   a monitoring module configured to monitor parameters of a call coming to the contact center;
   a sentiment detector module configured to detect sentiments of a user during the call, without conversion of the call from voice to text format;
   a pattern matching module configured to determine a script for an agent handling the call, based on the parameters of the call and the sentiments of the user during the call, wherein the script provides instructions to the agent to improve handling of the call, wherein the script comprises instructions for a change in one of a tone and a sentiment, to be used by the agent; and
   a script publishing module configured to publish the script to the agent handling the call.

2. The agent assisting system of claim 1, wherein the calls comprises voice calls, web chats, email messages, and text messages.

3. The agent assisting system of claim 1, wherein the parameters of the call are based upon selection of options by the user in an IVR menu of the contact center.

4. The agent assisting system of claim 1, wherein the parameters comprise providing details and purpose of the call.

5. The agent assisting system of claim 1, wherein the sentiments comprise positive sentiments and negative sentiments.

6. The agent assisting system of claim 1, wherein the pattern matching module comprises a Neural Network engine.

7. The agent assisting system of claim 1, wherein the pattern matching module is configured to prepare a list of scripts by utilizing audio recording of previous successful calls.

8. The agent assisting system of claim 7, wherein the pattern matching module is configured to determine a previous call having parameters substantially similar with the parameters of current call.

9. The agent assisting system of claim 7, wherein the pattern matching module is configured to select a script for current call from the list of scripts prepared, based upon parameters of the current call.

10. The agent assisting system of claim 1, wherein the script comprises providing instructions to the agent to modify handling of the call for converting the call into a successful call.

11. The agent assisting system of claim 1, wherein the agents utilize the scripts as a training material.

12. The agent assisting system of claim 1, further comprising a call transferring module configured to transfer the call to a supervisor of the agent based on the script.

13. A computer-implemented method for providing assistance to agents of a contact center during calls, comprising:
monitoring parameters of a call coming to the contact center;
detecting sentiments of a user during the call, without conversion of the call from voice to text format;
determining a script for an agent handling the call, based upon the parameters of call and the sentiments of the user during the call, wherein the script provides instructions to the agent to improve handling of the call, wherein the script comprises instructions for a change in one of a tone and a sentiment, to be used by the agent; and
publishing the script to the agent handling the call.

14. The computer-implemented method of claim 13, wherein the calls comprise voice calls, web chats, email messages, and text messages.

15. The computer-implemented method of claim 13, wherein the parameters provide details of the call.

16. The computer-implemented method of claim 13, wherein the script provides instructions to the agent to modify handling of the call for converting the call into a successful call.

17. The computer-implemented method of claim 13, further comprising transferring the call to a supervisor of the agent.

18. A non-transitory computer readable medium storing computer readable instructions when executed by a processor perform a method, comprising:
monitoring parameters of a call coming to the contact center;
detecting sentiments of a user during the call, without conversion of the call from voice to text format;
determining a suitable script for an agent handling the call, based upon the parameters of call and the sentiments of the user during the call, wherein the script provides instructions to the agent to improve handling of the call, wherein the script comprises instructions for a change in one of a tone and a sentiment, to be used by the agent; and
publishing the suitable script to the agent handling the call.

* * * * *